United States Patent [19]
Moore

[11] 3,855,722
[45] Dec. 24, 1974

[54] FISHING LURE CONSTRUCTION

[76] Inventor: James E. Moore, Rt. 3, Tullahoma, Tenn. 37388

[22] Filed: June 6, 1973

[21] Appl. No.: 367,439

[52] U.S. Cl............ 43/42.34, 43/42.28, 43/42.37, 46/167
[51] Int. Cl............................................ A01k 85/00
[58] Field of Search............ 43/42.34, 42.31, 42.09, 43/42.28, 42.37, 42.32; 46/91, 135 R, 167, 168, 165

[56] References Cited
UNITED STATES PATENTS

| | | | |
|---|---|---|---|
| 1,207,588 | 12/1916 | Maus | 43/42.09 |
| 1,574,341 | 2/1926 | Feldstein | 46/135 R X |
| 1,967,692 | 7/1934 | Walker | 46/165 |
| 2,477,460 | 7/1949 | Larson | 46/165 |
| 2,517,495 | 8/1950 | Kneece | 43/42.28 X |
| 2,619,772 | 12/1952 | Dikszas | 46/167 X |
| 2,740,222 | 4/1956 | Velton | 43/42.31 X |
| 2,994,151 | 8/1961 | Webb | 43/42.34 X |
| 3,091,049 | 5/1963 | Reimers | 43/42.31 |
| 3,504,454 | 4/1970 | Turbeville et al | 43/42.28 X |

FOREIGN PATENTS OR APPLICATIONS

| | | | |
|---|---|---|---|
| 253,838 | 6/1926 | Great Britain | 46/167 |

Primary Examiner—Louis G. Mancene
Assistant Examiner—Daniel J. Leach
Attorney, Agent, or Firm—Mason, Fenwick & Lawrence

[57] ABSTRACT

An artificial fishing lure having a main body including a head portion, a pair of eye cavities in the head portion, and a pair of eye assemblies recessed in the eye cavities for presenting a moving eye appearance when the lure is drawn through the water. The eye assemblies are formed of a hollow shell having a clear dome-like outer lens portion and a dark colored sphere freely movable in the hollow chamber of the shell responsive to inertial and impact forces and the like to create the moving eye appearance.

8 Claims, 5 Drawing Figures

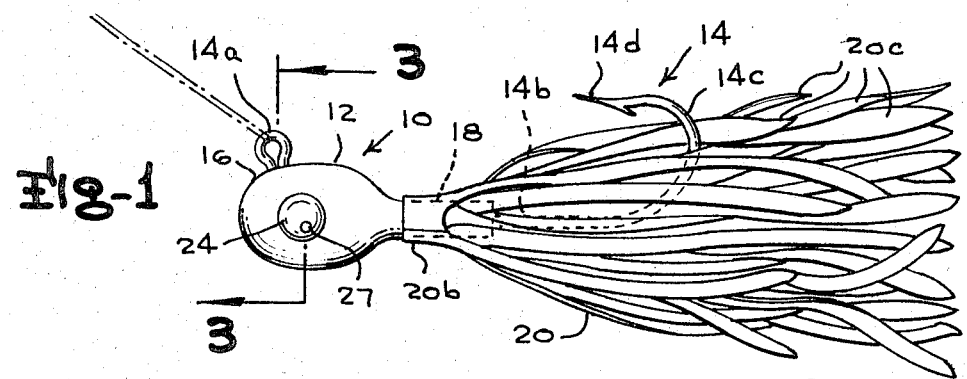
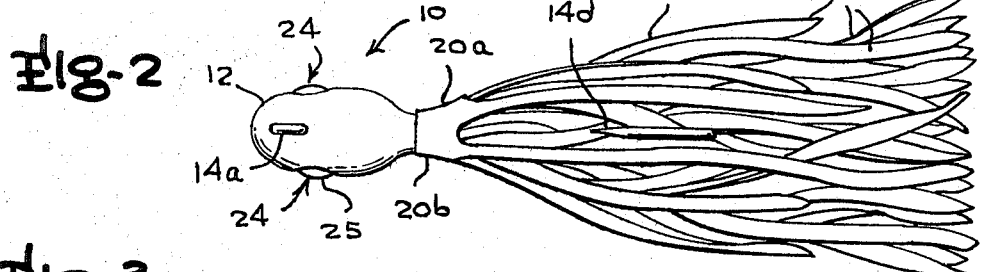
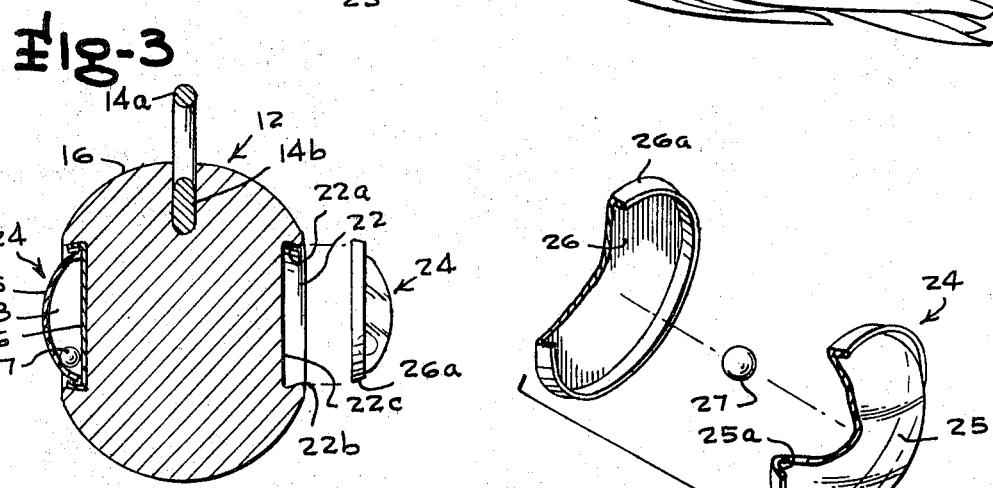
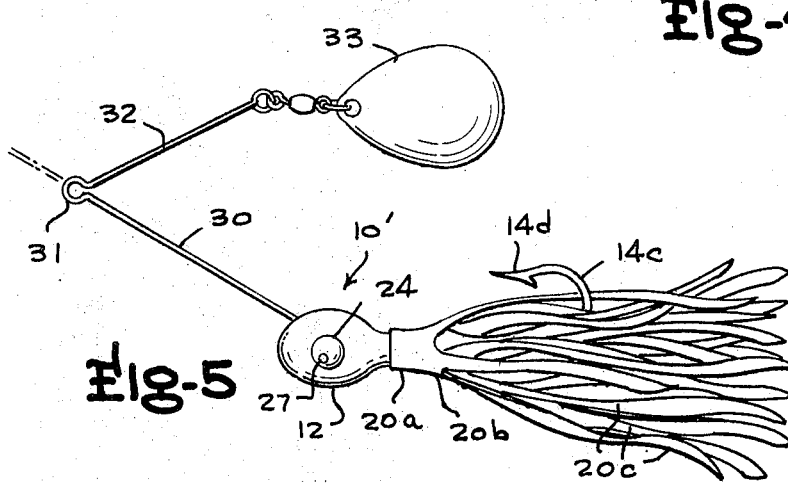

FISHING LURE CONSTRUCTION

BACKGROUND AND OBJECTS OF THE INVENTION

The present invention relates in general to artificial fish bait or fishing lures, and more particularly to fishing lures having a bait body provided with a head portion and a suitable fish hook or hooks assembled therewith, wherein eyes are assembled in the head portion having movable bead type representations of eyes recessed in the head portion of the lure to create the impression of moving eyes and which are capable of producing attention-commanding sounds.

Heretofore, many types of artificial fish baits or lures have been provided for fishing rods of the types commonly referred to as bait casting rods, spin casting rods, and spinner rods, wherein the lures have a head portion resembling in general confirmation the head of some living creature, with eyes formed or depicted on the head portion of the lure in some manner. Customarily, these eyes are either painted onto the lure head portion in the form to resemble eyes of the creature being depicted, or grotesque representations thereof, or the eyes may be formed by separate objects such as beads, buttons, pin heads, and the like, in all of which cases the eye is a stationary feature of the lure design having no moving parts.

An object of the present invention is the provision of a novel fishing lure construction having representations of eyes formed in the head portion of the lure by eye-simulating hollow shells having a transparent lens member and a movable bead or sphere therein which moves in response to gravitational or impact forces upon movement of the lure body to present a life-like moving-eye appearance.

Another object of the present invention is the provision of a novel fishing lure construction having a head portion of the lure provided with recessed cavities into which artificial eyes are inserted formed of a hollow shell of plano convex configuration providing a dome shaped transparent lens and a circular disc-like backing, preferably of opaque white or bright colored material, with a ball or small solid sphere located in the hollow interior of the shell which is free to roll and move about responsive to gravitational or impact forces upon movement of the lower body through the water to resemble a moving eye and to create fish-attracting sounds.

Other objects, advantages and capabilities of the present invention will become apparent from the following detailed description, taken in conjunction with the accompanying drawing illustrating preferred embodiments of the invention.

BRIEF DESCRIPTION OF THE FIGURES

FIG. 1 is a side elevation view of an artificial fishing lure embodying the invention;

FIG. 2 is a top plan view of the artificial fishing lure;

FIG. 3 is a vertical section view, on an enlarged scale, taken along the line 3—3 of FIG 1, with one eye assembly shown in elevation;

FIG. 4 is an exploded perspective view, on an enlarged scale, with parts broken away, showing details of the eye assembly employed in the fishing lure; and FIG. 5 is a side elevation view of a modified form of fishing lure embodying the present invention.

DETAILED DESCRIPTION OF PREFERRED EMBODIMENTS

Referring to the drawings, wherein like reference characters designate corresponding parts throughout the several figures, and particularly to FIGS. 1 through 4, the improved artificial fishing lure of the present invention is indicated generally by the reference character 10 and comprises a bait or lure body 12 which is formed, in the preferred embodiment illustrated in FIGS. 1 through 4, about a fish hook member 14 which may have the usual integral loop 14a at one end of the elongated shank 14b, with its hook formation 14c at the opposite end extending rearwardly from the lure body 12 and terminating in the barb and point 14d. The lure body includes a main body portion 16, which may also be referred to as the head portion of the lure, which in the illustrated embodiment is of generally elliptical lateral profile and generally elliptical vertical transverse cross-section, from which a constricted or reduced body portion 18 of substantially cylindrical configuration extends rearwardly, provided for removably receiving and retaining a "buck tail" or "fly" formation 20 on the reduced body portion. The lure body 12 forming the body portions 16 and 18 is preferably of a molded material, such as usual metal or metallic alloy materials employed for molded or cast metal bodies, for example molten lead, molded about the shank of the fish hook member 14. In one example, the fish hook may be positioned in a cavity mold having appropriately configurated cavities for the lure body, after which molten lead is poured into the mold cavity to create the lure body 12 molded about the shank 14b of the fish hook member. The buck tail formation 20 may, for example, comprise a short rubber sleeve 20a about which is wrapped and adhesively secured as by rubber cement one or more sheets of rubber, preferably having continuous leading edge portions 20b and cut over the major portion of the rubber sheet from the leading edge portion 20b through the trailing edge portion so as to provide separate strands or fringe portions 20c which upon the wrapping of the rubber sheets on the sleeve provide a tassel or buck tail appearance. The buck tail 20 may be used with the bait body 12 by slipping it over the barb end of the hook and working it along the hook portion and shank until the sleeve portion 20a of the buck tail formation reaches the reduced trailing end portion 18 of the lure body, whereupon the sleeve may be elastically expanded to fit it on the reduced body portion 18 to be held thereon by the contractile property of the expanded rubber. In the illustrated embodiment, the loop portion 14a of the fish hook member 14 projects upwardly from the top medial region of the main body portion 16 of the lure for attachment of the leader or fishing line thereto.

The main body portion 16 of the lure body 12 is provided with a pair of outwardly opening cavities 22 for receiving the eye assemblies, the cavities 22 in the illustrated embodiment being of circular profile and being undercut as indicated at 22a, so that the rims 22b bounding the entrances to the cavities 22 are of slightly reduced diameter relative to the base wall portion 22c of the cavities. The bait body may be suitably decorated, as by painting, to provide a natural appearance or an attention gathering colored surface, and preferably is so weighted, or its mass is so distributed, as to cause the hook to ride through the water with the prong 14c extending upwardly.

The eye assemblies 24 are preferably of a semi-rigid plastic so that they can be snapped or wedged into the eye cavities 22 and will remain in position slightly recessed within the eye cavities below the extended surface of the exterior of the main lure body so that the plastic material is protected from being marred or scratched when in use of when carried in tackle boxes. The eye assemblies comprise a spherically convex clear outer lens member 25 of clear plastic assembled along its circular periphery to a circular disc backing member 26 to define an eye simulating hollow sheel within which a small spherical ball 27 is free to move responsive to gravitational or impact forces or inertial forces. The outer lens member 25 is of clear or transparent plastic material, while the circular disc backing member 26 may be of a white colored plastic, and the spherical ball 27 which moves about within the hollow interior of the eye assembly shell is preferably a dark or black color and simulates the dark pupil or pupil-and-iris region of an eye, so that movement of the spherical ball 27 about the eye assembly during movement of the lure through the water creates the visual impression of a moving eyeball. In the illustrated embodiment, the circular disc backing member 26 is provided with a forwardly projecting annular rim portion 26a projecting from its periphery, and the outer lens member 25 is provided with a recurved annular lip portion 25a at its periphery which inwardly laps and bears against the rim 26a of the backing member 26 to be held thereby. The lens member 25 can be held in assembled relation to the backing member 26 either by frictional fit between the portions 25a and 26a, or by cementing or adhesively securing these portions together circumferentially about the perimeter of these two members. The eye assembly can either be forced or wedged into the eye cavities 22 and retained by reason of the undercut configuration of the walls of the cavities, or the eye assemblies may be cemented or adhesively retained in the eye cavities. It will be appreciated that the fishing lure of this construction, when drawn through the water by the fisherman, will yield both a moving eye appearance and also the dark spherical ball 27 when moving about the inner chamber 28 of the eye assembly will produce an attention gaining sound when the lure bounces over submerged logs or rocks or when its velocity is rapidly changed producing inertial forces which will cause the balls 27 to move. The use of these particular eye assemblies in the lure creates a more life-like appearance, so that both this feature and the sound producing feature generated by the moving ball 27 in each of the eye assemblies enhances the attraction of the lure.

Another embodiment of the lure is illustrated in FIG. 5, wherein the components corresponding to those of the first described embodiment are indicated by corresponding reference characters. The main body portion of the lure illustrated in FIG. 5, which is indicated generally by the reference character 10′, includes the same eye assemblies 24 as described in the first embodiment and the same buck tail configuration, but instead of having the fish hook loop extending from the top of the body portion, a wire indicated at 30 is molded into the lead body 12 to project forwardly from the lead body at an angle inclined to the axis of the shank of the hook. The wire 30 is bent to provide a semi-loop, as indicated at 31 and is then bent rearwardly at an acute angle relative to the portion extending from the lure body to the loop to provide an inclined leg 32 on which a spinner blade, spoon or similar member 33 is assembled by means of a swivel allowing the spinner blade 33 to revolve when the lure is drawn through the water, and thus create a "spinner type" lure.

It will be appreciated that the lure body may be of any other known type of fishing lure configuration, such as a solid elongated body of the so-called "plug" type resembling the configuration of a small fish or minnow or other creature, or may be of segmented or hinged body construction, rather than the type illustrated wherein a buck tail is employed. Obviously the eye construction herein described, wherein the dark ball or sphere is movable about in the chamber defined between the lens and backing member, may be used in any fishing lure configuration to obtain the moving eye effect and enhance the attractiveness of the lure.

What is claimed is:

1. An artificial fishing lure adapted to be drawn through water by a fishing line, comprising a main lure body having a generally rounded leading head portion, a fish hook coupled to said lure body, said lure body being a molded metal body molded about the shank portion of the fish hook, a pair of eye assemblies mounted on the head portion for producing a moving eye appearance responsive to inertial and impact forces during movement of the lure through the water; each eye assembly comprising a hollow shell including a circular backing member having an outwardly facing generally flat planar surface of a selected color resembling the sclera portion of an eye, a transparent generally domeshaped lens member having an uninterrupted concave inner surface and joined peripherally to and curving outwardly from the backing member to define an uninterrupted enclosed space therebetween, and a spherical ball of a color contrasting to that of said backing member and freely disposed in said enclosed space, said ball being of smaller diameter than the maximum spacing between the outermost portion of said lens member and backing member to freely roll about in said enclosed space and thereby produce a moving eye appearance responsive to said inertial and impact forces on the lure when drawn through the water.

2. An artificial fishing lure as defined in claim 1, wherein said lure body is of oval configuration.

3. An artificial fishing lure as defined in claim 1, including a buck tail formation secured to said body in trailing relation thereto.

4. An artificial fishing lure adapted to be drawn through water by a fishing line, comprising a main lure body having a generally rounded leading head portion, a fish hook coupled to said lure body, a pair of eye assemblies mounted on the head portion for producing a moving eye appearance responsive to inertial and impact forces during movement of the lure through the water; each eye assembly comprising a hollow shell including a circular backing member having an outwardly facing generally flat planar surface of a selected color resembling the sclera portion of an eye, a transparent generally dome-shaped lens member having an uninterrupted concave inner surface and joined peripherally to and curving outwardly from the backing member to define an uninterrupted enclosed space therebetween and a spherical ball of a color contrasting to that of said backing member and freely disposed in said enclosed space, said ball being of smaller diameter than the maximum spacing between the outermost portion of said lens member and backing member to freely roll about in said enclosed space, thereby producing a moving eye appearance responsive to said inertial and impact forces on the lure when drawn through the water, said lure body having a pair of round eye undercut cavities formed therein, said eye assemblies being respectively seated in said undercut eye cavities with their backing members against a base surface of the associated eye cavity and the perimeter of the eye assembly projecting into the undercut portions of the cavity.

5. An artificial fishing lure adapted to be drawn through water by a fishing line, comprising a main lure body having a generally rounded leading head portion, a fish hook coupled to said lure body, a pair of eye assemblies mounted on the head portion for producing a moving eye appearance responsive to inertial and impact forces during movement of the lure through the water; each eye assembly comprising a hollow shell including a circular backing member having an outwardly facing generally flat planar surface of a selected color resembling the sclera portion of an eye, a transparent generally dome-shaped lens having an uninterrupted concave inner surface and joined peripherally to and curving outwardly from the backing member to define an uninterrupted enclosed space therebetween and a spherical ball of a color contrasting to that of said backing member and freely disposed in said enclosed space, said ball being of smaller diameter than the maximum spacing between the outermost postion of said lens member and backing member to freely roll about in said enclosed space, thereby producing a moving eye appearance responsive to said inertial and impact forces on the lure when drawn through the water, said lure body having a pair of round eye cavities formed therein, said circular backing member and dome-shaped lens member being of a semi-rigid character and having complemental annular peripheral flanges nesting one within another when assembled, said eye assemblies being respectively seated in said eye cavities with their backing members against a base surface of the associated eye cavity, the depth of the eye cavities being greater than that of said peripheral flanges when the eye assembly is seated in recessed relation within the eye cavities.

6. An artificial fishing lure as defined in claim 4, wherein said circular backing member and dome-shaped lens member are of a semi-rigid character and have complemental annular peripheral flanges nesting one within another when assembled, the complemental peripheral flanges of the eye assembly projecting complementally into the undercut portions of the cavity, and the depth of the eye cavities being greater than that of the outermost portions of the lens members when is recessed relation in the eye cavities.

7. An artificial fishing lure as defined in claim 3, wherein said lure body has a pair of round eye cavities formed therein, said circular backing member and dome-shaped lens member being of a semi-rigid character and having complemental annular peripheral flanges nesting one within another when assembled, said eye assemblies being respectively seated in said eye cavities with their backing members against a base surface of the associated eye cavity, the depth of the eye cavities being greater than that of said peripheral flanges when the eye assembly is seated in recessed relation within the eye cavities.

8. An artificial fishing lure as defined in claim 3, wherein said lure body has a pair of round eye undercut cavities formed therein, said circular backing member and dome-shaped lens member being of a semi-rigid character and having complemental annular peripheral flanges nesting one within another when assembled, said eye assemblies being respectively seated in said eye cavities with their backing members against a base surface of the associated eye cavity and the complemental peripheral flanges of the eye assembly projecting complementally into the undercut portions of the cavity, the depth of the eye cavities being greater than that of the outermost portions of the lens members when in recessed relation in the eye cavities.

* * * * *